Aug. 17, 1965 J. H. McWHIRTER 3,201,728

EVAPORATIVE COOLED INDUCTIVE APPARATUS HAVING CAST SOLID INSULATION WITH COOLING DUCTS FORMED THEREIN

Filed Aug. 23, 1962 3 Sheets-Sheet 1

Aug. 17, 1965 J. H. McWHIRTER 3,201,728
EVAPORATIVE COOLED INDUCTIVE APPARATUS HAVING CAST SOLID INSULATION WITH COOLING DUCTS FORMED THEREIN
Filed Aug. 23, 1962 3 Sheets-Sheet 2

3,201,728

EVAPORATIVE COOLED INDUCTIVE APPARATUS HAVING CAST SOLID INSULATION WITH COOLING DUCTS FORMED THEREIN

James H. McWhirter, Sharon, Pa., assignor to Westinghouse Electric Corporation, East Pittsburgh, Pa., a corporation of Pennsylvania Filed Aug. 23, 1962, Ser. No. 219,040
8 Claims. (Cl. 336—60)

This invention relates in general to electrical inductive apparatus and more particularly to improved methods of insulating and cooling electrical inductive apparatus.

The use of castable liquid or molding types of resins such as phenolics, polyesters, or epoxies in the construction of electrical inductive apparatus, such as transformers, has resulted in transformers which are smaller and lighter than conventional transformers. Embedding the windings of the electrical apparatus in void free thermosetting resins produces an insulation system where a creepage failure is not possible, and since the resins used have very high dielectric strength, the chance of failure by puncture of the resin is very remote. The excellent insulating qualities of the resins allows marked reduction in insulation clearances, thus accounting for the smaller size and weight previously referred to. Other advantages of the solid thermosetting resin insulation are improved mechanical strength, simplification of construction, resistance to unfavorable environments, and elimination of the hazards and inconvenience of oil.

Although the solid resin insulation is ideal from the insulation standpoint, and it is a good conductor of heat compared to most insulating materials, it is necessary to introduce additional cooling on all but the very small transformer ratings. Transformers in the power class will generally require additional cooling and in all cases, additional cooling is desirable. However, the cooling means should be introduced without sacrificing any of the advantages of the solid thermosetting resin insulation system.

Accordingly, it is a general object of this invention to provide a new and improved electrical inductive apparatus.

It is a more particular object of this invention to provide a new and improved insulation and cooling system for electrical inductive apparatus.

Briefly, the present invention accomplishes the above cited objects by providing a transformer utilizing the superior insulating qualities of thermosetting resins and highly efficient cooling ducts formed within or between the transformer windings. More specifically, the solid thermosetting resin insulation system is provided with cooling ducts suitably disposed in the insulation system in thermal communication with the embedded inductive coils. A preferred embodiment of the invention involves vaporization cooling in which a suitable liquid is disposed in the cooling ducts and the heat produced by the coils during the operation of the electrical apparatus causes said liquid to vaporize. The temperature of the cooling liquid rises to its vaporization temperature and the liquid vaporizes, absorbing a large quantity of heat equal to the latent heat of vaporization of the particular liquid used. The liquid absorbs the latent heat of vaporization and vaporizes with no further increase in temperature. The vapor then travels to a cooling surface or heat exchanger where it gives up its latent heat of vaporization and condenses, still with no appreciable change in temperature. The condensed liquid is then returned to the cooling ducts for further cycling.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings in which.

Figures 1A, 2:
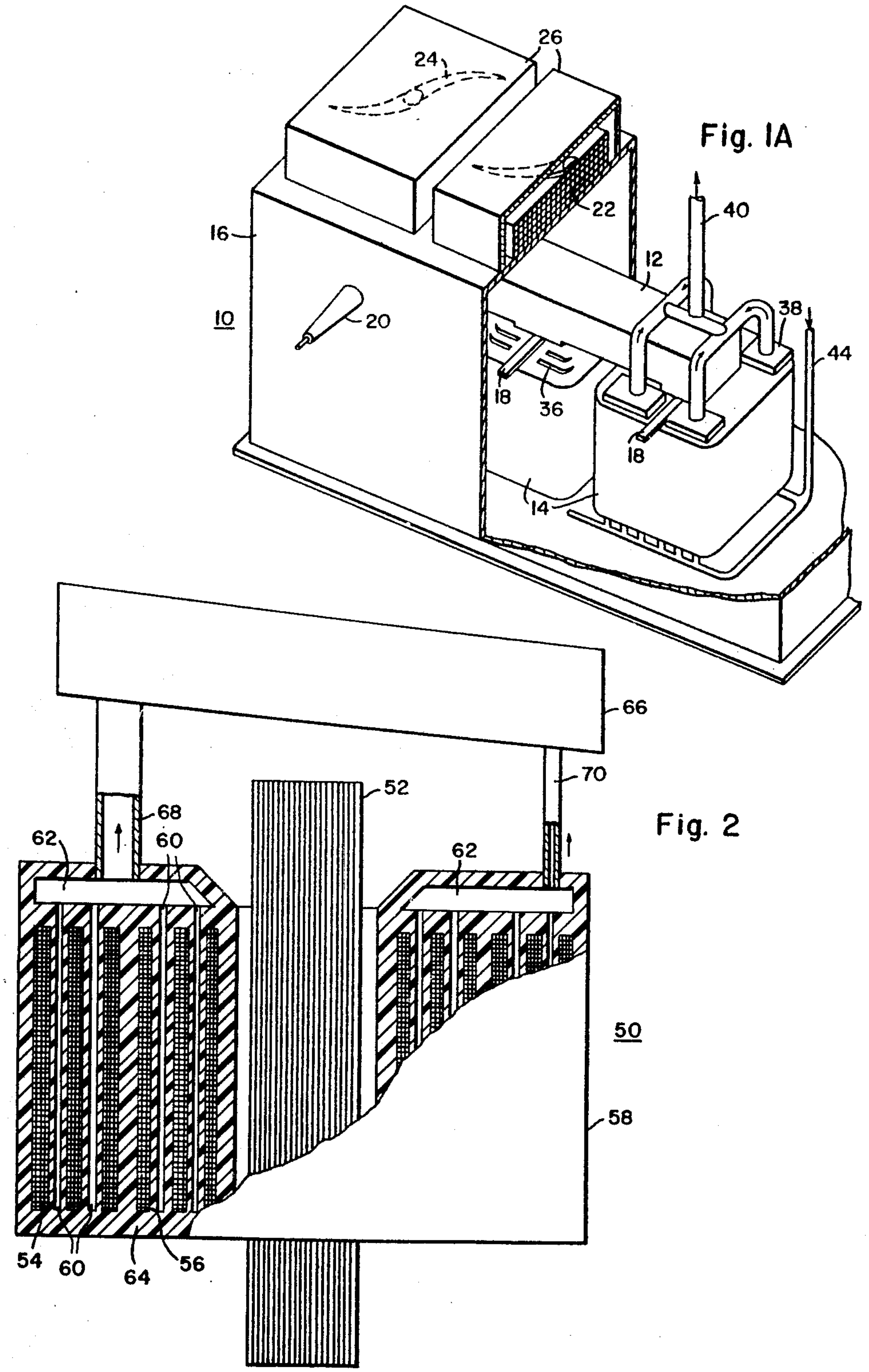
FIGURE 1A is a perspective view of a transformer, partially in section, illustrating one embodiment of the invention.
FIG. 2 is a front elevational view of a transformer, partially in section, illustrating another embodiment of the invention.
Figure 1B:
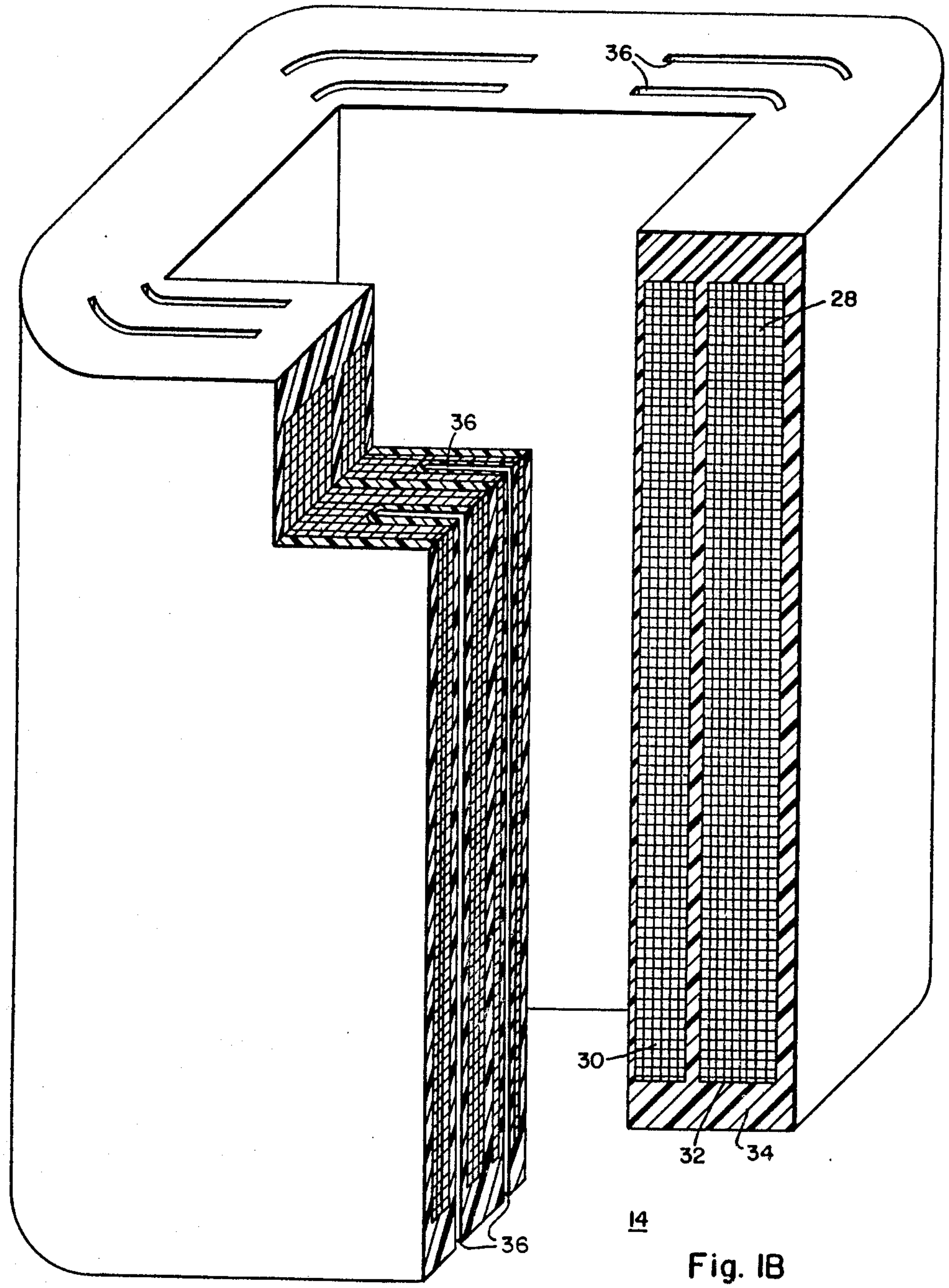
FIG. 1B is a perspective view, partially in section, of a winding assemblage as shown in FIG. 1A.

Referring to FIGS. 1A and 1B of the drawings, and FIG. 1A in particular, there is illustrated generally an induction apparatus or transformer 10 utilizing one embodiment of the invention. The transformer 10 comprises a magnetic core 12 and associated windings 14 disposed within an enclosure or casing 16 formed of steel, or other suitable material. Electrical leads 18 are shown extending from the electrical windings 14 and are connected to bushings 20. Said bushings are insulatingly mounted on the enclosure 16. Heat exchangers 22 and associated fans 24 are, in this instance, mounted on top of the enclosure 16 and disposed within a housing or enclosure 26.

The electrical windings 14, shown in greater detail in FIG. 1B, comprise low and high voltage windings 30 and 32 respectively. Low and high voltage windings 30 and 32, have their electrical conducting strands 28 completely embedded in a voidless cast thermosetting insulating resin 34. The cast solid resin insulation insulates the high and low voltage windings 30 and 32 from each other and from ground and provides the necessary electric strength within the coils themselves. Slots or cooling ducts 36 are shown formed within the low and high voltage windings 30 and 32 between the electrical conducting strands 28. The cooling ducts 36, in this instance, extend completely through the electrical winding assembly 14.

Referring again to FIG. 1A, manifolds 38 completely cover the ducts 36 at both the top and bottom of the winding 14. The manifolds 38, mounted over the duct openings 36, are connected to a piping system 40 which is in turn connected to the heat exchangers 22. A return piping system 44 is connected from the heat exchanger 22 to the bottom of the ducts 36.

Any one of several cooling systems may be used with the transformer designs disclosed. However, a preferred cooling system from the standpoint of efficiency and simplicity utilizes the principles of vaporization cooling. In a vaporization cooling system a liquid coolant is disposed within the cooling ducts 36 to a level substantially at the top of said ducts, or higher. Since liquid coolant will boil at a temperature determined by the pressure in the cooling system, it is possible to obtain a desired boiling temperature by selecting a liquid and evacuating the cooling system to the pressure required to obtain said boiling temperature. If the pressure in the cooling system is reduced to the vapor pressure of the coolant being used, the cooling system pressure will change with changes in temperature so that the coolant will always be at the boiling temperature for any system pressure. Therefore, the boiling temperature of the liquid coolant is determined by the design of the coolant system and its losses rather than upon the properties of the coolant. Once this temperature is fixed, the system pressure is determined by the vapor pressure-temperature relationship for the particular coolant being used. Thus, a liquid with a high boiling point at atmospheric pressure will result in a low pressure in the cooling system, and a liquid with a low boiling point at atmospheric pressure will result in a high pressure in the cooling system.

In operation, the heat generated by the electrical current flowing in the electrical conductors 28 is transferred to the coolant filled ducts 36. The coolant in the ducts is heated, causing vaporization of the coolant adjacent to the duct walls. The vaporized coolant bubbles upward through the remaining liquid coolant and enters the manifolds 38, piping system 40 and vapor to air heat exchanger 22. Upon being cooled in the heat exchangers 22, the coolant condenses and is returned by gravity to the bottom of the ducts 36 through piping system 44.

Heating the coolant to the vapor state causes the coolant temperature to rise to the vaporization temperature where it absorbs a large amount of heat equal to the heat of vaporization of the particular coolant being used, without any further increase in temperature. When the coolant condenses in the heat exchangers 22, heat equal to the heat of vaporization is given up by the coolant and absorbed by the heat exchanger 22, without appreciably changing the temperature of the coolant.

Cooling the transformer by the highly efficient vaporization method requires only a small amount of cooling medium and the cooling cycle is initiated and maintained without the use of a mechanical pump. Because vaporization cooling is more effective, the number of coolant ducts 36 required and their width may be minimized, making the construction of the transformer simple, strong and inexpensive to manufacture. Vaporization cooling also requires a relatively small heat exchanger because highly effective cooling takes place with a small change in temperature. Further, the use of an inert, non-flammable liquid coolant eliminates the fire hazard associated with the use of a flammable coolant.

The insulating thermosetting resin 34 may be a castable liquid or molding type of resin such as the phenolics, epoxies, or the like. The resin should have a low viscosity to enable it to impregnate dense structures without producing voids. Further physical requirements of the insulation system 34 are mechanical strength, ability to deform under stress without fracturing and low dielectric loss characteristic over a wide temperature range. Many resins meet the above requirements and are suitable for use as insulating medium 34 in the electrical winding 14. For example, a resin of the epoxy type that has been found to be suitable is described in patent application Serial No. 190,256, filed April 26, 1962, by Newton C. Foster, entitled Modified Epoxy Resin, and assigned to the same assignee as the present application.

The coefficient of thermal expansion of unfilled resin is, in general, much higher than that of common metals. Therefore, to prevent cracking of the resin upon thermal cycling of the inductive apparatus due to the different coefficients of expansion between the resin and metal winding inserts, a flexible resin may be used or, the coefficient of expansion of the resin may be reduced by adding inert, inorganic, non-friable fillers to the resin. Some fillers that are suitable for reducing the coefficient of expansion of the thermosetting resins are sand, powdered silica, mica, flint and beryllium aluminum silicate.

The cooling medium used should be inert, non-flammable and have excellent heat transfer properties. Liquids that have been found to exhibit the required properties, including a low viscosity, low surface tension and high heat of vaporization, are the fully-fluorinated products composed of a mixture of compounds containing eight carbon atoms. The carbon to fluorine bond is extremely strong giving excellent chemical stability and high resistance to thermal decomposition and electric discharge. For example, perfluoro-propyltetrahydropyran, $C_8F_{16}O$, having a boiling point of 101° C. at atmospheric pressure has been found to be suitable.

To form the cooling ducts 36, within the low voltage and high voltage windings 30 and 32, the coils 30 and 32 may be wound with slabs of wax or other suitable material placed at appropriate locations. If wax is used, it is melted after the winding 14 has been completed and the resin has been polymerized. If other materials are used, for example rubber coated with silicone grease, they should extend past the winding assembly far enough to enable them to be pulled from their respective positions after the coils are wound and the resin has been set. Rubber makes an excellent duct former because its cross section decreases when tension is applied to its upon removal.

The winding shown in FIG. 1A may be formed by first winding the low and high voltage coils 30 and 32 using strips of rubber the width and thickness of the desired ducts 36 and with a length somewhat greater than that of the duct. The rubber may be coated with a thin layer of silicone grease to facilitate the later removal of the rubber. To prevent insulation flashover through the ducts, several layers of insulating material may be wrapped around the rubber and a metallic screen folded around the insulation material with a small overlap. Insulation is placed between the overlapping portion of the screen to keep the screen from making a complete circuit and thus prevent circulating current losses in said screen. The wrap of insulating material provides a solid insulation between the duct and the screen. Both the layer insulating material and the screen are the same length as the coil winding space so that they do not extend into the major insulation. To facilitate removal, the rubber strip extends for several inches beyond the end of the coil winding space at both ends.

It will be appreciated, that the cooling ducts may be formed by disposing metallic or non-metallic tubes at suitable places within or between electrical windings. However, the heat transfer to the coolant in the ducts is not as satisfactory as when the insulation itself forms the wall of the cooling duct.

The windings 30 and 32 are then wound with the rubber strips being placed at the proper locations to form the cooling ducts. The windings with the duct formers in place, are disposed in a container of suitable size and suspended to keep the coils from coming into contact with the container walls. A filler such as sand or beryllium aluminum silicate is added to the container and the filler is impregnated with resin to fill the container. The resin is then polymerized to produce a void free solid assembly of the windings and insulation. If desired, instead of suspending the winding assembly in the casing, a small amount of filler and resin may be added to the container and polymerized. The winding assembly may then be suitably placed on this hardened resin and the remaining portion of the container may be filled with filler and resin and polymerized. The assembly may be then removed from the container and the rubber duct formers removed to form the cooling ducts. When the resin has been hardened, the rubber strips are removed by applying tension to the ends. The silicone grease prevents adherence of the resin to the rubber duct former.

In the polyphase construction shown in FIG. 1A, the windings 14 may be placed in a casing or enclosure 16. If desired, the enclosure 16 may be made gas tight and filled with an inert high dielectric strength liquid or gas to provide insulation for the leads that extend from the solid insulation 34. For example, one of the electronegative gases such as $SF_6$ may be used to provide insulation for the bushing leads 18, interphase leads (not shown) and tap changer leads (not shown).

FIG. 2 is a functional drawing showing another embodiment of the invention utilizing a different cooling duct arrangement. In this instance, the transformer 50 comprises a magnetic core 52 and high and low voltage coils 54 and 56 suitably disposed in casing 58. The cooling ducts 60 formed within the high and low voltage coils 54 and 56 are connected to a manifold 62 at its upper end and they are sealed at their lower end by insulating material 64, which may be a thermosetting resin with a suitable filler, as hereinbefore described. Insulating material 64 completely surrounds and embeds the coils 54 and 56. The manifold 62 is connected to a heat exchanger by inlet pipes 68 and outlet pipe 70. A cooling liquid, which may be a fluorocarbon as hereinbefore described, is introduced into the cooling duct 60 to a level near the top of the ducts 60, or higher.

In operation, the heat generated by the current flowing through the coils 54 and 56 is conducted to the ducts 60 where the cooling medium adjacent to the walls of the ducts, is vaporized. The vaporized coolant bubbles upward through the remaining cooling liquid into the manifold 62 and to the condenser or heat exchanger 66 through heat exchanger inlet pipe 68. The vapor gives up its heat of vaporization in the heat exchanger and condenses, returning by gravity to the manifold 62 through the heat exchanger outlet pipe 70. From the manifold 62, the condensed liquid returns to the cooling ducts 60. Thus, there is a continuous cycle of vapor leaving the cooling ducts 60 and condensed coolant returning to said ducts. It should be noted, that in this instance, the exiting vapor and returning liquid use the same end of the cooling ducts 60.

Figure 3A:
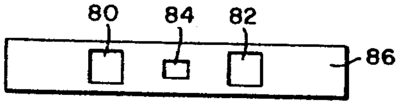
FIG. 3A is a top view of cooling ducts illustrating still another embodiment of the invention.
Figure 3B:
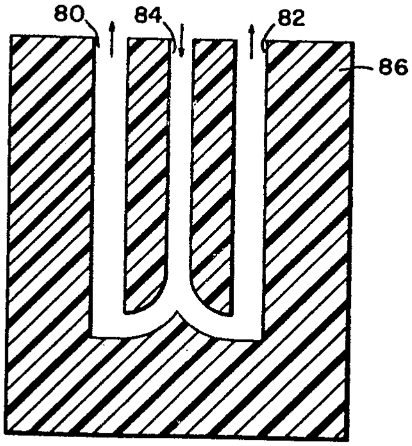
FIG. 3B is a front elevational view in section of the cooling ducts illustrated in FIG. 3A.

The flow of liquid and vapor in the cooling ducts may be improved by the arrangement shown in FIGS. 3A and 3B. FIG. 3A shows a top view of the cooling duct arrangement and FIG. 3B is a front elevation in section showing the duct arrangement in greater detail. In this particular embodiment, the vapor producing ducts 80 and 82 are placed in close proximity to the heat generating windings, while the return duct 84 has a greater thickness of insulation 86 between the ducts 84 and the heat generating windings. As illustrated, the coolant return duct 84 is connected to the vapor producing ducts 80 and 82 at the lower end of said ducts. In operation, the coolant in cooling ducts 80 and 82 vaporizes because of the close proximity of these ducts to the heat producing windings. The vaporized coolant exits to heat exchangers as hereinbefore described and is condensed. The condensed coolant is returned to duct 84. Duct 84 is connected to cooling ducts 80 and 82 at their lower ends, thus returning the coolant to ducts 80 and 82 where the cycle begins again. While the duct construction shown in FIGS. 3A and 3B is not as simple to manufacture as the ducts shown in FIG. 2, the heat removal rate is higher with this arrangement than the arrangement shown in FIG. 2. Both duct arrangements utilize the highly efficient vaporization cooling previously discussed, where the coolant absorbs its heat of vaporization with no increase in temperature and gives up its heat of vaporization with substantially no loss in temperature in the heat exchanger. Thus, highly efficient cooling is obtained using a relatively small heat exchanger because the temperature drop required to be produced by the heat exchanger is very small.

In the construction shown in FIG. 2, it may be desirable to suitably dispose grounded screens relative to the windings 54 and 56. For example, a grounded screen may be embedded in the resin next to the core 52 and opposite the high voltage winding 54.

Figure 4:
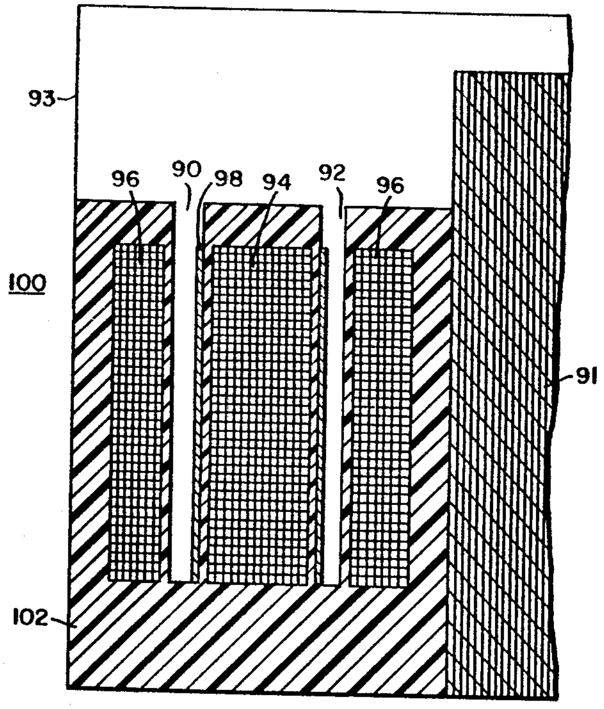
FIG. 4 is a front elevational view of a transformer, in section, illustrating another embodiment of the invention.

The cooling ducts shown in the transformers of FIGURES 1A and 2 show the cooling ducts being located within the windings to improve heat transfer from the windings to the cooling ducts. There is, also, a minimum of voltage stress across the cooling duct when the duct is located within the winding, as opposed to between the high voltage and low voltage windings. However, it is not absolutely essential that the cooling ducts be located within said windings. FIG. 4 illustrates a transformer 100 with windings 94 and 96 inductively disposed on magnetic core 91 and placed within an enclosure 93. Cooling ducts 90 and 92 are in this instance, disposed between the high voltage and low voltage windings 94 and 96, respectively. A grounded shield 98 may be placed around the outside of the high voltage winding 94 to reduce the voltage stress across the cooling ducts 90 and 92.

In operation, the cooling system of transformer 100 operates similar to the transformers hereinbefore described. A portion of the cooling liquid, which may be a fluorocarbon is disposed in cooling ducts 90 and 92. The cooling liquid vaporizes and bubbles upward through the still liquid portion of the cooling medium, condensing on the cooling surfaces of the enclosure 93 and returning by gravity to the ducts 90 and 92. The high voltage and low voltage coils 94 and 96 are embedded in a thermosetting resin 102 as hereinbefore described.

It will therefore, be apparent that there has been disclosed an inductive apparatus having a new and improved insulation and cooling system. Since one medium is not called upon to be both an insulator and a coolant, it is possible to choose a superior insulating system and a superior cooling system and combine the two in one electrical apparatus. This has been accomplished in this invention. The thermosetting resin insulation, hereinbefore described, is an excellent insulator and the vaporization cooling system described is highly efficient and yet inexpensive considering that no pumps are required and the heat exchanger may be relatively small in view of the fact that it is called upon to reduce the temperature of the coolant by only a few degrees.

The vaporization cooling system hereinbefore described is the preferred embodiment of the invention, because the novel coil and insulation construction disclosed makes this highly efficient cooling means practical. However, it is to be understood that other cooling systems may be used. For example, liquid coolants, such as oil, may be circulated through the cooling ducts shown in FIGS. 1A and 1B, either by forced or natural circulation, and cooled in suitable heat exchanger means. Also, gases, such as the electronegative gas $SF_6$ may be used as the coolant and circulated through the cooling ducts in the transformer. The gas would also be cooled in suitable heat exchanger means. Also, since the cooling ducts are formed of non-corrosive resin, it will be appreciated that water could be used as the liquid cooling agent. The water could either be vaporized and condensed in heat exchanger means, or merely circulated through the transformer and heat exchanger means in the liquid state. Since no contaminants would be added to the water by the resin ducts, the water heated in the cooling ducts could be delivered to a reservoir (not shown) and used for industrial or domestic purposes, with make-up water being added as required, to keep the transformer temperature within rated values.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. In electrical apparatus, a winding assembly having electrical coils, insulating means comprising thermosetting resin, said electrical coils being embedded in said insulating means, cooling ducts formed in said thermosetting resin, with said thermosetting resin extending from said electrical coils to said cooling ducts and forming the walls of said cooling ducts, fluid cooling means disposed within said cooling ducts, heat exchanger means, means providing a closed circuit between said cooling ducts and said heat exchanger means to confine said fluid cooling means to said cooling ducts and heat exchanger means, said fluid cooling means cooling the electrical apparatus by circulation between said cooling ducts and said heat exchanger means.

2. In electrical apparatus, a winding assembly having primary and secondary windings disposed in inductive relationship with a magnetic core, insulating means comprising thermosetting resin and filler, said primary and secondary windings being embedded in said insulating means, cooling ducts formed within said primary and secondary windings, said insulating means forming the walls of said cooling ducts, liquid cooling means disposed within said cooling ducts, heat exchanger means, means providing a closed circuit for said liquid cooling means between said cooling ducts and said heat exchanger means to confine said liquid cooling means to said cooling ducts and heat exchanger means, said liquid cooling means cooling the electrical apparatus by vaporizing in said cooling ducts and condensing in said heat exchanger means, said liquid cooling means vaporizing and condensing in continuous cycles while said electrical apparatus is energized.

3. In electrical inductive apparatus, a winding assembly having a plurality of coils disposed in inductive relationship with magnetic core means, insulating means comprising thermosetting resin and filler, said coils being embedded in said insulating means, cooling ducts formed in said insulating means, said insulating means extending from said coils to said cooling ducts and forming the walls of said cooling ducts, said cooling ducts having an opening at only one end, liquid cooling means disposed within said cooling ducts, heat exchanger means, piping means connecting said open end of the cooling ducts with said heat exchanger means to confine said liquid cooling means to said cooling ducts and heat exchanger means, said liquid cooling means cooling the electrical apparatus by vaporizing in said cooling ducts and condensing in said heat exchanger means.

4. In electrical inductive apparatus, a winding assembly having primary and secondary windings disposed in inductive relationship with magnetic core means, insulating means comprising thermosetting resin and filler, said primary and secondary windings being embedded in said void free insulating means, cooling ducts formed in thermal communication with said primary and secondary windings, said insulating means extending from said primary and secondary windings to said cooling ducts and forming the walls of said cooling ducts, said cooling ducts having an opening at each end, liquid cooling means disposed within said cooling ducts, heat exchanger means, piping means connecting each end of said cooling ducts with said heat exchanger means to confine said liquid cooling means to said cooling ducts and said heat exchanger means, said liquid cooling means cooling the electrical inductive apparatus by vaporizing in said cooling ducts and condensing in said heat exchanger means.

5. In an electrical transformer, a winding assembly having electrical windings disposed in inductive relationship with magnetic core means, insulating means comprising thermosetting resin and finely divided, inorganic, nonfriable inert fillers, said electrical windings being embedded in said insulating means, cooling ducts formed in said insulating means between said electrical windings, said insulating means extending from said electrical windings to said cooling ducts and forming the walls of said cooling ducts, voltage stress reducing means comprising metallic screen disposed between said electrical windings and said cooling ducts, liquid cooling means disposed within said cooling ducts, said liquid cooling means being a polyfluoro hydrocarbon having a boiling point within the operating range of the electrical transformer, heat exchanger means, means connecting said cooling ducts with said heat exchanger means to confine said liquid cooling means to said cooling ducts and said heat exchanger means, said liquid cooling means cooling the electrical apparatus by vaporizing in said cooling ducts and condensing in said heat exchanger means.

6. In an electrical transformer, a winding assembly having electrical coils, insulating means comprising thermosetting resin, said electrical coils being embedded in said insulating means, a plurality of cooling duct arrangements formed in said insulating means in thermal communication with said electrical coils, each cooling duct arrangement comprising ducts having one open end and the other ends interconnected, said insulating means extending from said electrical coils to said cooling ducts and forming the walls of said ducts, liquid cooling means disposed within said cooling ducts, heat exchanger means, means connecting the open ends of said cooling duct arrangements with said heat exchanger means to confine said liquid cooling means to said cooling ducts and heat exchanger means, said liquid cooling means cooling the electrical apparatus by vaporizing in said cooling ducts and condensing in said heat exchanger means, each cooling duct arrangement being so constructed that the liquid is vaporized in certain ducts and condensed cooling liquid is returned in other ducts.

7. In an electrical transformer, the combination comprising a plurality of winding assemblies and heat exchanger means, said winding assembly comprising electrical windings disposed in inductive relationship with magnetic core means, insulating means comprising thermosetting resin, said electrical windings being embedded in said insulating means, cooling ducts formed in thermal communication with said electrical windings, said insulating means extending from said electrical windings to said cooling ducts and forming the walls of said cooling ducts, shielding means reducing voltage stress across said cooling ducts, piping means connecting said cooling ducts with said heat exchanger means to form a closed path which includes said cooling ducts and said heat exchanger means, liquid cooling means disposed within said cooling ducts and confined to said cooling ducts and heat exchanger means by said piping means, said piping and heat exchanger means being evacuated to a pressure substantially equal to the vapor pressure of said liquid cooling means, said liquid cooling means cooling the electrical transformer by vaporizing in said cooling ducts and condensing in said heat exchanger means.

8. In electrical inductive apparatus, a winding assembly having a plurality of electrical coils disposed in inductive relation with magnetic core means, insulating means comprising thermosetting resin and beryllium aluminum silicate filler, said plurality of electrical coils being embedded in said insulating means, cooling ducts formed within said winding assembly in thermal communication with said electrical coils, said insulating means extending from said electrical coils to said cooling ducts and forming the walls of said ducts, liquid cooling means disposed within said cooling ducts, heat exchanger means, means connecting said cooling ducts with said heat exchanger means to confine said liquid cooling means to said cooling ducts and said heat exchanger means, said liquid cooling means cooling the electrical inductive apparatus by vaporizing in said cooling ducts and condensing in said heat exchanger means.

References Cited by the Examiner

UNITED STATES PATENTS

| | | | |
|---|---|---|---|
| 1,317,003 | 9/19 | Creighton | 336—205 |
| 1,342,310 | 6/20 | Steinberger | 336—205 X |
| 2,872,651 | 2/59 | Treanor | 336—59 X |
| 2,990,443 | 6/61 | Camilli | 336—60 X |
| 3,024,298 | 3/62 | Goltsos et al. | 336—58 X |
| 3,073,885 | 1/63 | Camilli | 336—61 |
| 3,187,773 | 6/64 | Nichols et al. | 336—205 |

FOREIGN PATENTS

| | | |
|---|---|---|
| 517,479 | 1/40 | Great Britain. |

JOHN F. BURNS, *Primary Examiner.*

JOHN P. WILDMAN, LARAMIE E. ASKIN, *Examiners.*